(12) United States Patent
Park et al.

(10) Patent No.: US 9,696,816 B2
(45) Date of Patent: Jul. 4, 2017

(54) SYSTEM AND METHOD FOR INPUTTING CHARACTERS IN TOUCH-BASED ELECTRONIC DEVICE

(75) Inventors: Sung Wook Park, Goyang-si (KR); Se Hwan Park, Suwon-si (KR); Ji Hoon Lee, Suwon-si (KR); Ji Hoon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 641 days.

(21) Appl. No.: 13/561,748

(22) Filed: Jul. 30, 2012

(65) Prior Publication Data

US 2013/0033444 A1    Feb. 7, 2013

(30) Foreign Application Priority Data

Aug. 5, 2011    (KR) .................. 10-2011-0078022

(51) Int. Cl.
*G06F 3/01*    (2006.01)
*G06F 3/0488*    (2013.01)

(52) U.S. Cl.
CPC .......... *G06F 3/018* (2013.01); *G06F 3/04883* (2013.01)

(58) Field of Classification Search
CPC .............................. G06F 3/018; G06F 3/04883
USPC .................................................. 345/173, 168
See application file for complete search history.

(56) References Cited

U.S. PATENT DOCUMENTS

| | | | |
|---|---|---|---|
| 2008/0291171 A1 | 11/2008 | Shin et al. | |
| 2009/0085874 A1 | 4/2009 | Heo et al. | |
| 2009/0097753 A1* | 4/2009 | Millington | 382/187 |
| 2011/0134068 A1* | 6/2011 | Shimoni | 345/173 |
| 2011/0202493 A1* | 8/2011 | Li | 706/50 |
| 2012/0206382 A1* | 8/2012 | Kusano | 345/173 |
| 2012/0326988 A1 | 12/2012 | Woo | |
| 2013/0021260 A1 | 1/2013 | Hwang | |
| 2013/0021286 A1* | 1/2013 | Sudo | 345/173 |
| 2013/0050125 A1* | 2/2013 | Sudo | 345/173 |
| 2013/0127728 A1* | 5/2013 | Park et al. | 345/168 |

FOREIGN PATENT DOCUMENTS

| | | |
|---|---|---|
| KR | 1020100088508 | 8/2010 |
| KR | 100992386 | 11/2010 |
| KR | 1020110043427 | 4/2011 |
| KR | 1020110048940 | 5/2011 |
| KR | 1020110056464 | 5/2011 |
| KR | 101046914 | 6/2011 |
| KR | 1020110082956 | 7/2011 |

* cited by examiner

*Primary Examiner* — Fred Tzeng
(74) *Attorney, Agent, or Firm* — The Farrell Law Firm, P.C.

(57) ABSTRACT

A character input system and method is provided that enables a user to input and edit block characters via a touch-based electronic device, with a limited number of input motions. The character input method includes receiving a first interaction, displaying a first character in response to the first interaction, receiving a second interaction successively after the first interaction, identifying a second character that is formed by combining the first character with a character according to the second interaction, and displaying the second character instead of the first character.

10 Claims, 13 Drawing Sheets

<701>

<703>

SYSTEM AND METHOD FOR INPUTTING CHARACTERS IN TOUCH-BASED ELECTRONIC DEVICE

PRIORITY

This application claims priority under 35 U.S.C. §119(a) to Korean Patent Application Serial No. 10-2011-0078022, which was filed in the Korean Intellectual Property Office on Aug. 5, 2011, the contents of which are incorporated herein by reference.

BACKGROUND OF THE INVENTION

1. Field of the Invention

The present invention relates generally to character input systems, and more particularly, to a system and method that enables a user to input block characters via a touch-based electronic device and/or to edit them, with a reduced amount of input motions.

2. Description of the Related Art

With the rapid development of digital technology, various types of mobile communication devices have been released. Examples of such devices are mobile communication terminals, Personal Digital Assistants (PDAs), electronic organizers, smartphones, and tablet Personal Computers (tablet PCs). Mobile devices provide a variety of services such as a video call, an electronic note, document editing, e-mail, Internet, and Social Networking Service (SNS), as well as a voice call or an SMS message transmission.

Mobile devices are equipped with touch screens that allow users to execute a variety of functions and input characters using an object (e.g., a finger or pointer). Extensive research has been conducted on systems for inputting characters via touch screens.

Conventional character input systems are difficult to use because they provide a relatively small space for character input, and require users to repeatedly perform a number of input motions to form a block character (or a syllable). In addition, in order to edit part of a block character, conventional character input systems require users to delete at least part of the block character, and then to re-input the correct block character or corresponding characters to input the correct block character. However, this process increases the time users take to form one block character (or syllable) due to an increased number of input motions.

Accordingly, there is a need in the art for new character input systems that enable users to easily input characters via a touch-based electronic device with a limited amount of input motions.

SUMMARY OF THE INVENTION

The present invention has been made in view of the above problems, and provides system and method that enables users to easily input characters in a touch-based electronic device with a limited amount of input motions.

In accordance with an embodiment of the present invention, a character input method includes receiving a first interaction, displaying a first character in response to the first interaction, receiving a second interaction successively after the first interaction, identifying a second character that can be formed by combining the first character with a character according to the second interaction, and displaying the second character, replacing with the first character.

In accordance with an embodiment of the present invention, a touch-based electronic device includes a touch screen and a controller. The touch screen displays a touch input area and a display area. The touch input area receives touches for characters and the display area displays the input characters. The controller displays, when a first interaction is input to a particular character area in the touch input area, a first character, allocated to the character area, on the display area. The controller creates, when a second interaction successively after the first interaction occurs, a second character that is formed by combining the first character with a character according to the second interaction. The controller replaces the first character with the second character and displays it on the display area.

BRIEF DESCRIPTION OF THE DRAWINGS

The features and advantages of the present invention will become more apparent from the following detailed description in conjunction with the accompanying drawings, in which.

DETAILED DESCRIPTION OF EMBODIMENTS OF THE INVENTION

Figure 1:
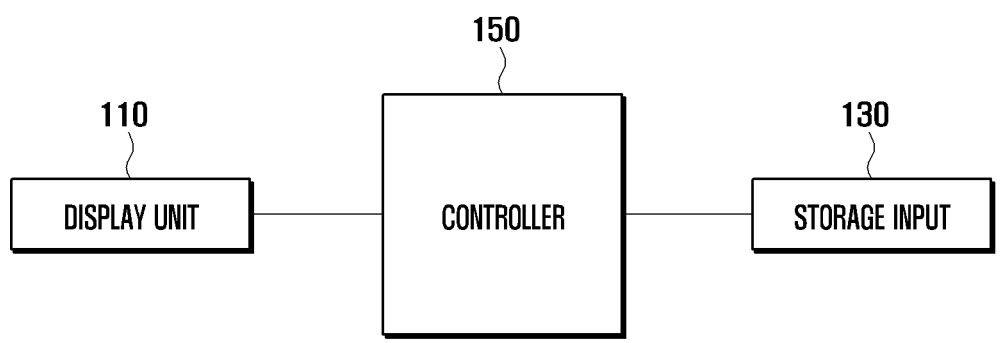
FIG. 1 illustrates a touch-based electronic device according to an embodiment of the present invention.

Hereinafter, embodiments of the invention are described in detail with reference to the accompanying drawings. The same reference numbers are used throughout the drawings to refer to the same or similar parts. Detailed descriptions of well-known functions and structures incorporated herein may be omitted for the sake of clarity and conciseness.

The present invention relates to a system and method that enables users to easily and rapidly input characters in a touch-based electronic device. To this end, when a first interaction is input to the touch-based electronic device in a character input mode, a first character is displayed. According to the successive input of a second interaction, a second character is created by a combining of the first character with a character according to the second interaction. The first character is then replaced with the second character, and the second character is displayed.

When an interaction occurs to correct the second character, an identification is made as to characters that can be combined with the second character according to the correction interaction. The second character on the display area is then replaced with the combined character, and is displayed.

The term 'first interaction' refers to a touch interaction input to a particular character area on a touch keypad. The term 'second interaction' refers to at least one of a draw interaction by which the first interaction occurs and then drags in a certain direction without losing touch, a draw-and-backtrack-flick interaction by which the draw interaction drags a distance in a direction, alters its moving direction to the opposite direction and then moves back a relatively shorter distance in the opposite direction, and a draw-and-backtrack-drag interaction by which the draw interaction moves a distance in a direction, and then drags back greater than a preset distance (which is larger than the draw-and-backtrack-flick interaction) in the opposite direction.

When a touch interaction occurs to display a first character on a character area and then the successive interaction of a draw interaction occurs, the first character is combined with a character according to the draw interaction to form a third character, thereby displaying the third character on the display area, instead of the first character. When the successive interaction of a draw-and-back-flick interaction occurs, the third character is combined with a character according to the draw-and-back-flick interaction to form a fourth character, thereby displaying the fourth character on the display area, instead of the third character. When the successive interaction of a draw-and-backtrack-drag interaction occurs, the fourth character is combined with a character according to the draw-and-backtrack-drag interaction to form a fifth character, thereby displaying the fifth character on the display area, instead of the fourth character.

Although the following embodiments of a character input system will be described based on Korean characters, it should be understood that the present invention is not limited thereto. That is, the present invention can also be applied to systems for inputting a variety of characters of various languages, each of which being formed with at least two strokes, such as a block character (or a syllable) that is formed by a 'consonant'+a 'vowel,' or a 'consonant'+a 'vowel'+a 'consonant.'

FIG. 1 illustrates a touch-based electronic device according to an embodiment of the present invention.

The touch-based electronic device includes a display unit 110, a storage unit 130, and a controller 150, and although not shown, may further include an audio processing unit with a microphone and a speaker, a digital broadcasting module for receiving broadcasts for Digital Multimedia Broadcasting (DMB) or Digital Video Broadcasting (DVB) a camera module for acquiring still images or videos, a short-range communication module for supporting short-range Radio Frequency (RF) communication, such as Bluetooth®, Infrared Data Association (IrDA), Radio Frequency IDentification (RFID), and Near Field Communication (NFC) an RF module for supporting a voice call, a video call, and data communication an Internet module for supporting Internet Protocol (IP) based Internet communication, and a battery supplying electric power to the components of the device.

The display unit 110 displays the states and operations of the touch-based electronic device, such as a home screen, execution screens related to character input modes, or screens according to the execution of applications. The display unit 110 may be implemented with a Liquid Crystal Display (LCD), Light Emitting Diodes (LEDs), Organic Light Emitting Diodes (OLEDs), or Active Matrix Organic Light Emitting Diodes (AMOLEDs), for example. The display unit 110 may further include a touch-based interface, in which case it senses an event created via a user's touch, creates a signal according to the event, and transfers the signal to the controller 150.

The display unit 110 provides a touch input area and a display area. The touch input area provides a soft type of touch keypad that enables the user to input characters in a character input mode. The display area displays the characters input via the touch input area. The touch input area provides a touch keypad where particular characters (e.g., phonemes) are not excluded from all characters forming the user's native language, according to the user's created event. For example, the touch input area provides a touch keypad where only consonants are arrayed. In addition, the touch keypad may further include a correction key for allowing the user to easily correct a block character.

During the display of a screen in a character input mode, the display unit 110 may display the screen in a landscape or portrait mode according to the rotation or tilt of the touch-based electronic device, or may adaptively or automatically switch the screen according to the alteration between the landscape mode and the portrait mode.

The storage unit 130 stores applications and data created when the applications are executed. The storage unit 130 may be implemented with at least one or more volatile and non-volatile memory devices. Examples of the non-volatile memory devices are Read Only Memory (ROM) and flash memory. An example of the volatile memory device is Random Access Memory (RAM). The storage unit 130 stores an Operating System (OS) of the touch-based electronic device, data and programs that are related to the input operations and display operations of the display unit 110. The storage unit 130 temporarily or permanently stores data and programs that are related to the character input functions in the touch-based electronic device, and also stores particular characters and mapping information of the user's event input mode to input the particular characters. The mapping information may be defined when the touch-based electronic devices are manufactured or according to the user's settings.

The controller 150 controls the entire operation of the touch-based electronic device, including character input functions. For example, the controller 150 can distinguish between first and second interactions and a correction interaction, in a character input mode. Then, the controller 150 can input characters corresponding to the interaction or combine the characters. The first interaction corresponds to a user's interaction. The second interaction corresponds to a draw interaction, a draw-and-backtrack-flick interaction, and a draw-and-backtrack-drag interaction.

For example, when a first interaction is input to a particular character area in the touch input area, the controller 150 displays a first character, allocated to the character area, on the display area. When a second interaction occurs successively after the first interaction, the controller 150 creates a second character by combining the first character with a character according to the second interaction. The controller 150 replaces the first character with the second character, which it then displays on the display area.

When the controller 150 receives an interaction to correct the second character, it identifies characters that can be combined with the second character according to the correction interaction. The controller 150 then replaces the second character with the combined character and displays the combined character.

The touch interaction refers to an input to a particular character area to which a particular character a touch keypad is allocated. The draw interaction refers to a touching and moving in a certain direction without losing touch on the character area. The draw-and-backtrack-flick interaction refers to moving a distance in a direction, and then moving back a distance in the opposite direction. The draw-and-backtrack-drag interaction refers to moving a certain distance in a direction, and then moving back greater than a preset distance (which is larger than the draw-and-backtrack-flick interaction) in the opposite direction. The correction interaction refers to correcting a block character, for example. The method for inputting characters according to the interactions will be described later with reference to the accompanying drawings.

The controller 150 controls the typical functions of the touch-based electronic device, such as executing an application and controlling the operations and the screen display. The controller 150 receives signals corresponding to events created via a touch-based input interface in a variety of input modes, and controls the corresponding functions. The controller 150 can also control the reception/transmission of data via wired/wireless communication mode.

The touch-based electronic device shown in FIG. 1 can be applied to all types of electronic devices, such as a bar type, a folder type, a slide type, a swing type, and a flip-flop type. The touch-based electronic device according to the present invention includes all information communication devices, multimedia devices, and their applications, which are operated according to communication protocols corresponding to a variety of communication systems. For example, the touch-based electronic device can be applied to mobile communication terminals, tablet Personal Computers (PCs), smartphones, digital cameras, Portable Multimedia Players (PMPs), media players, mobile game players, Personal Digital Assistants (PDAs). In addition, the character input system and method of the present invention can be adapted to touch-based display devices, such as digital television sets, Digital Signages (DSs), and Large Format Displays (LFDs).

Figure 2:
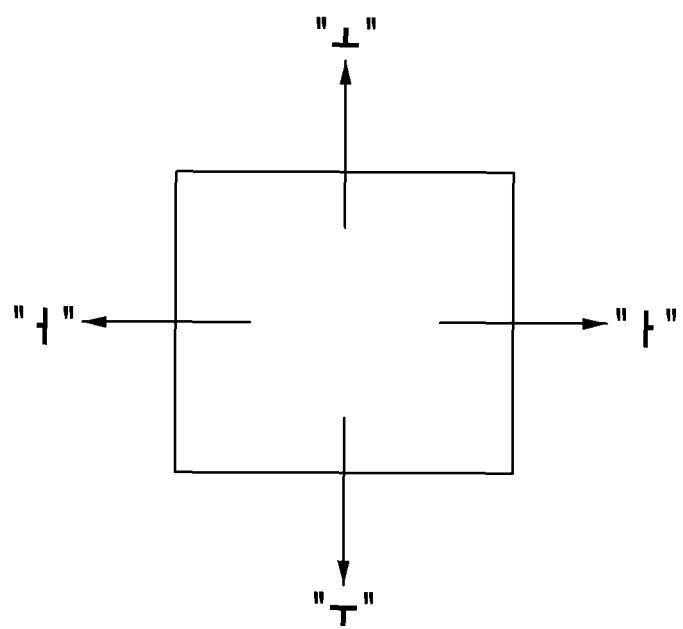
FIGS. 2 and 3 illustrate interactions for inputting characters via a draw gesture to a touch-based electronic device according to an embodiment of the present invention.
Figure 3:
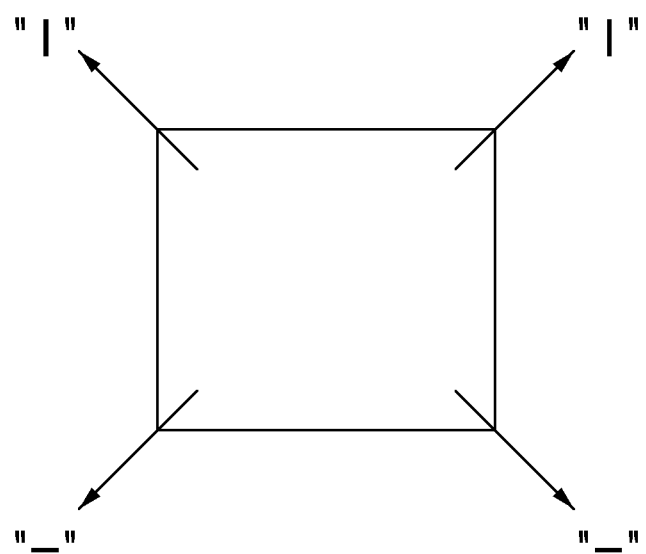

FIGS. 2 and 3 illustrate a method for inputting characters via draw interactions to a touch-based electronic device according to an embodiment of the present invention.

Referring to FIGS. 2 and 3, part of the Korean characters (e.g., a predefined group of Korean vowels 'ㅏ, ㅓ, ㅗ, ㅜ, ㅡ, and ㅣ') are input to a touch-based electronic device via a user's draw interactions.

As shown in FIGS. 2 and 3, the user inputs a draw interaction (e.g., a flick, a move, a drag) that moves starting from a point in a character area allocated to a particular character (e.g., a particular consonant) to the outside (e.g., top, bottom, left, right, or diagonal directions), thereby inputting a corresponding character (e.g., a preset group of Korean vowels, 'ㅏ, ㅓ, ㅗ, ㅜ, ㅡ, ㅣ') previously mapped to a corresponding direction. According to the stroke directions and the shapes of Korean vowels, Korean vowels are divided into a left direction group of vowels, a right direction group of vowels, a top direction group of vowels, a bottom direction group of vowels, a top diagonal direction group of vowels, and a bottom diagonal direction group of vowels.

As shown in FIG. 2, if the user draws strokes in the left, right, top and bottom from the center of the character area, vowels 'ㅓ', 'ㅏ', 'ㅗ', and 'ㅜ' are input to the touch-based electronic device, respectively. In addition, as shown in FIG. 3, if the user draws a stroke in the top left or right diagonal direction from the center of the character area, the vowel 'ㅣ' is input to the touch-based electronic device. Likewise, if the user draws a stroke in the bottom left or right diagonal direction from the center of the character area, the vowel 'ㅡ' is input to the touch-based electronic device.

Part of the Korean vowels are determined according to which side the point '●' is located with respect to the vowel 'ㅡ' and 'ㅣ'. For example, the vowel 'ㅏ' is determined in such a manner that since the point '●' is located at the right of the vowel 'ㅣ', the vowel 'ㅏ' belongs to the right group of Korean vowels. The vowel 'ㅓ' is determined in such a manner that since the point '●' is located at the left of the vowel 'ㅣ', it belongs to the left group of Korean vowels. The vowel 'ㅗ' is determined in such a manner that since the point '●' is located above the vowel 'ㅡ', it belongs to the top group of Korean vowels. The vowel 'ㅜ' is determined in such a manner that since the point '●' is located below the vowel 'ㅡ', it belongs to the bottom group of Korean vowels. As such, the Korean vowels are defined and grouped based on the stroke directions on the display area, which enables a user to intuitively understand how to input vowels to the touch-based electronic device.

Figure 4:
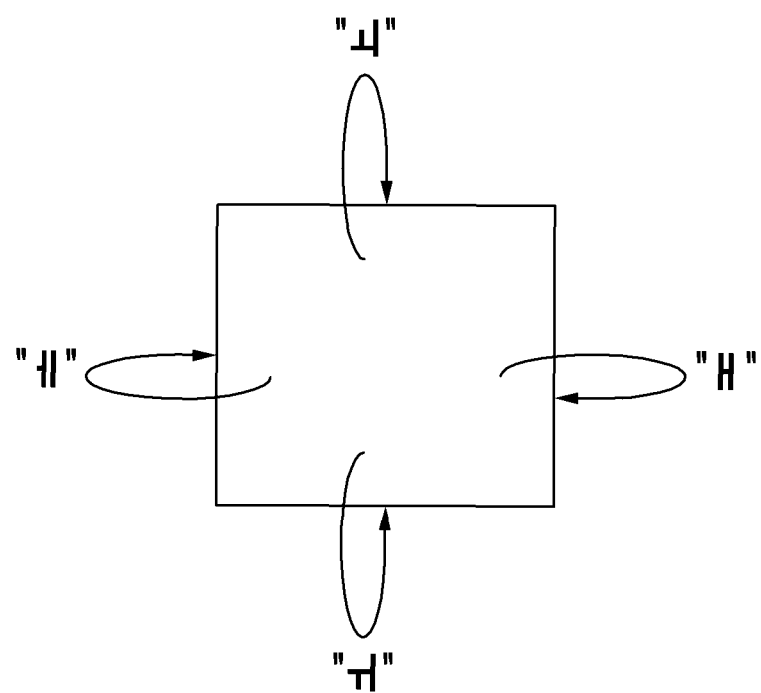
FIGS. 4 and 5 illustrate interactions for inputting characters via a draw-and-backtrack-flick gesture to a touch-based electronic device according to an embodiment of the present invention.
Figure 5:
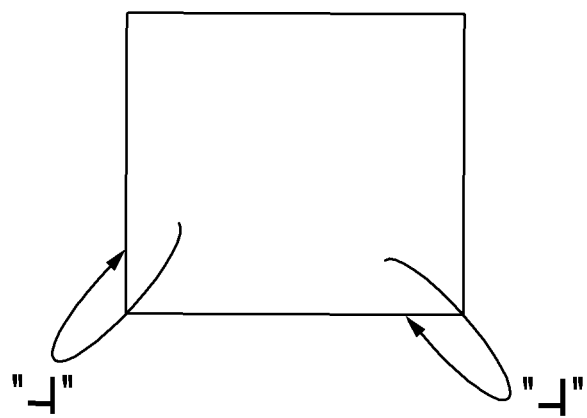

FIGS. 4 and 5 illustrate a method for inputting characters via draw-and-backtrack-flick interactions to a touch-based electronic device according to an embodiment of the present invention.

Referring to FIGS. 4 and 5, part of the Korean characters (e.g., a predefined group of Korean vowels 'ㅐ, ㅔ, ㅚ, ㅟ, ㅢ') are input to a touch-based electronic device via a user's draw-and-backtrack-flick interactions, by which an interaction touches and moves starting from a point in a character area allocated to a particular character (e.g., a particular consonant) to the outside (e.g., top, bottom, left, right, or diagonal directions), a certain distance, and then moves back in the opposite direction a certain distance, thereby inputting a corresponding character (e.g., a preset group of Korean vowels, 'ㅐ, ㅔ, ㅚ, ㅟ, ㅢ') previously mapped to a corresponding direction. That is, the user inputs a draw-and-backtrack-flick interaction in such a manner that he/she touches and drags the touch, in the manner of the draw gesture shown in FIGS. 2 and 3, a certain distance in a direction, and then moves back a certain distance in the opposite direction without losing touch.

As shown in FIG. 4, if the user inputs a draw-and-backtrack-flick interaction in such a manner that he/she draws strokes, a certain distance, in the left, right, top and bottom directions from the center of the character area, and then draws strokes a certain distance in the opposite directions without losing touch, vowels 'ㅔ, ㅐ, ㅚ and ㅟ' are input to the touch-based electronic device, respectively. In addition, as shown in FIG. 5, if the user inputs a draw-and-backtrack-flick interaction in such a manner that he/she draws a stroke in the bottom left or right diagonal direction from the center of the character area, and then draws the stroke in the opposite direction without losing touch, the vowel 'ㅢ' is input to the touch-based electronic device.

Part of the Korean vowels are determined according to which side the point '●' is located with respect to the vowel 'ㅡ' and 'ㅣ', and then the determined vowels are combined with the vowel 'ㅣ' according to the draw-and-backtrack-flick interactions. For example, the vowel 'ㅐ' is determined in such a manner that the point '●' is located at the right of the vowel 'ㅣ', so that the vowel 'ㅐ' belongs to the right group of Korean vowels (ㅏ), and then the determined vowel 'ㅏ' is combined with the vowel 'ㅣ', thereby creating the vowel 'ㅐ'. The vowel 'ㅐ' is determined in such a manner that the point '●' is located at the left of the vowel 'ㅣ', so that the vowel 'ㅣ,' belongs to the left group of Korean vowels (ㅓ), and then the determined vowel 'ㅓ' is combined with the vowel 'ㅣ', thereby creating the vowel 'ㅔ'. The vowel 'ㅗㅣ' is determined in such a manner that the point '●' is located above the vowel '—', so that the vowel '—,' belongs to the top group of Korean vowels (ㅗ), and then the determined vowel 'ㅗ' is combined with the vowel 'ㅣ', thereby creating the vowel 'ㅗㅣ'. The vowel 'ㅟ' is determined in such a manner that the point '●' is located below the vowel '—,' so that the vowel '—,' belongs to the bottom group of Korean vowels (ㅜ), and then the determined vowel 'ㅜ' is combined with the vowel 'ㅣ,' thereby creating the vowel 'ㅟ'. Likewise, the vowel 'ㅢ' is determined in such a manner that the vowel '—', allocated to the group of Korean vowels (—) in the bottom left or right diagonal direction, is combined with the vowel 'ㅣ', thereby creating the vowel 'ㅢ.'

Figure 6:
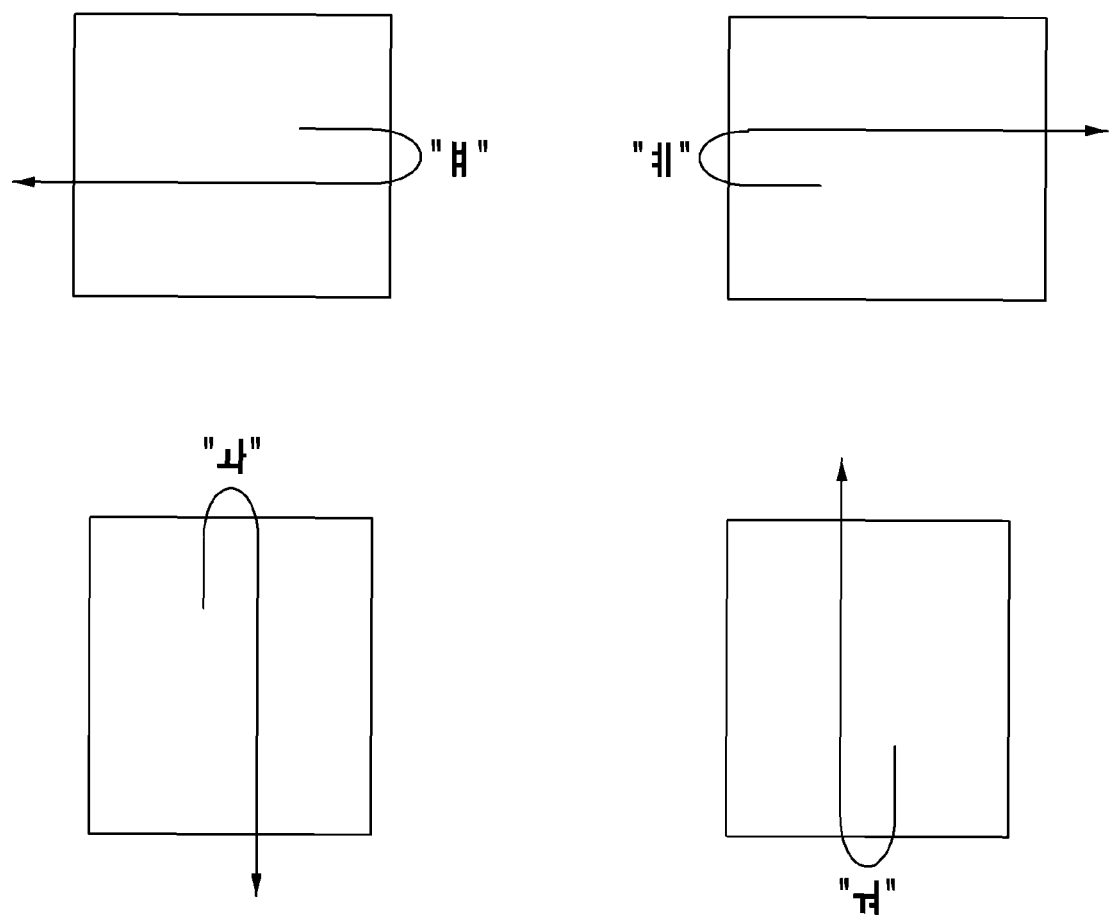
FIGS. 6 and 7 illustrate interactions for inputting characters via a draw-and-backtrack-drag gesture to a touch-based electronic device according to an embodiment of the present invention.

FIG. 6 illustrates a method for inputting characters via a draw-and-backtrack-drag interaction to a touch-based electronic device according to an embodiment of the present invention.

Referring to FIG. 6, part of the Korean characters (e.g., a predefined group of Korean vowels 'ㅐ, ㅔ, ㅘ, ㅟ') are input to a touch-based electronic device via a user's backtrack drag interaction interactions.

As shown in FIG. 6, the user inputs a draw-and-backtrack-drag interaction, meaning that an interaction touches and moves starting from a point in a character area allocated to a particular character (e.g., a particular consonant) to the outside (e.g., top, bottom, left, and right direction), a certain distance and then moves back greater than a preset distance (which is larger than the draw-and-backtrack-flick interaction) in the opposite direction, thereby inputting a corresponding character (e.g., a preset group of Korean vowels, 'ㅐ, ㅔ, ㅘ, ㅟ') previously mapped to a corresponding direction.

Although the draw-and-backtrack-flick interaction and the draw-and-backtrack-drag interaction are similar gestures, they differ from each other in terms of the distance when moving back. That is, as described above referring to FIGS. 4 and 5, if the draw-and-backtrack-flick interaction moves back greater than a preset distance in the opposite direction, it is determined as a draw-and-backtrack-drag interaction.

As shown in FIG. 6, if the user inputs a draw-and-backtrack-drag interaction in such a manner that he/she draws strokes, a certain distance, in the right, left, top and bottom directions from the center of the character area, and then draws strokes more than a preset distance in the opposite directions (to the center of the character area) without losing touch, vowels 'ㅐ, ㅔ, ㅘ, ㅟ' are input to the touch-based electronic device, respectively.

Part of the Korean vowels are determined according to which side the point '●' is located with respect to the vowel '—' and 'ㅣ', and then the determined vowels experience a first combination with the vowel 'ㅣ' according to the backtrack interactions after the draw interaction of the draw-and-backtrack flick or drag interactions.

If the backtrack interactions move to the center of the character area more than a preset distance, the first combined vowels further experience a second combination with the point '●'. For example, the vowel 'ㅐ' is determined in such a manner that the point '●' is located at the right of the vowel 'ㅣ', so that the vowel 'ㅣ,' belongs to the right group of Korean vowels (ㅏ), and then the determined vowel 'ㅏ' experiences a first combination with the vowel 'ㅣ', thereby creating the vowel 'ㅐ.' After that, the first combined vowel 'ㅐ' experiences a second combination with the point '●', thereby creating the vowel 'ㅐ'. The vowel 'ㅔ' is determined in such a manner that the point '●' is located at the left of the vowel 'ㅣ', so that the vowel 'ㅣ,' belongs to the left group of Korean vowels (ㅓ), and then the determined vowel 'ㅓ' experiences a first combination with the vowel 'ㅣ,' thereby creating the vowel 'ㅔ'. After that, the first combined vowel 'ㅔ' experiences a second combination with the point '●', thereby creating the vowel 'ㅔ'. The vowel 'ㅘ' is determined in such a manner that the point '●' is located above the vowel '—,' so that the vowel '—,' belongs to the top group of Korean vowels (ㅗ), and then the determined vowel 'ㅗ' experiences a first combination with the vowel 'ㅣ', thereby creating the vowel 'ㅗㅣ'. The first combined vowel 'ㅗㅣ' then experiences a second combination with the point '●', thereby creating the vowel 'ㅘ'. The vowel 'ㅟ' is determined in such a manner that the point '●' is located below the vowel '—' so that it belongs to the bottom group of Korean vowels (ㅜ), and then the determined vowel 'ㅜ' experiences a first combination with the vowel 'ㅣ', thereby creating the vowel 'ㅟ'. The first combined vowel 'ㅟ' then experiences a second combination with the point '●', thereby creating the vowel 'ㅟ.' Although the embodiment is implemented with the Korean characters, it can also be applied to a variety of characters in corresponding languages.

Figure 7:
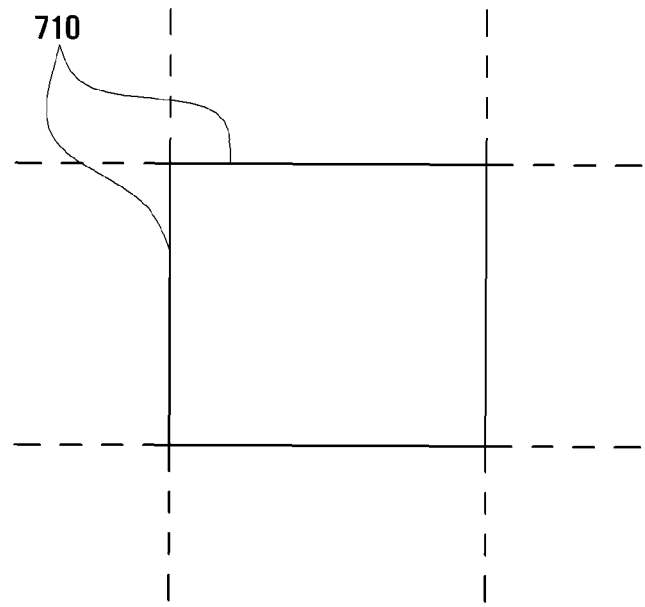
Figure 7:
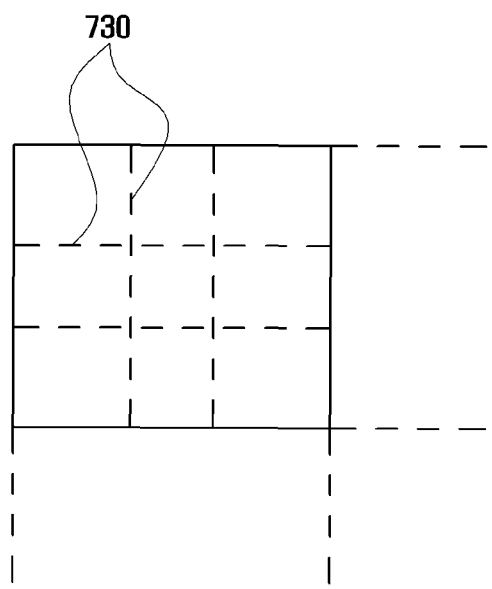

FIG. 7 illustrates the draw-and-backtrack drag interaction according to an embodiment of the present invention.

As shown in diagram 701, the preset distance to distinguish between the draw-and-backtrack-flick interaction and the draw-and-backtrack-drag interaction is set by using the boundary 710 between character areas. For example, if the backtrack interaction of the draw-and-backtrack-flick interaction or the draw-and-backtrack-drag interaction moves passing through the boundary 710, it is determined as part of the draw-and-backtrack-drag interaction, and thus as the draw-and-backtrack-drag interaction. Alternatively, as shown in diagram 703, the preset distance to distinguish between the draw-and-backtrack-flick interaction and the draw-and-backtrack-drag interaction can be set by using the sub-boundaries 730 in each character area 740.

For example, as shown in diagram 703, it is assumed that the character area 740 is divided into nine sub-areas via two respective horizontal and vertical sub-boundaries 730. In that case, if the backtrack interaction of the draw-and-backtrack-flick interaction or the draw-and-backtrack-drag interaction moves passing through one of the sub-boundaries 730 from the stop point of the draw interaction, it is determined as part of the draw-and-backtrack-drag interaction, and thus as the draw-and-backtrack-drag interaction. In particular, if the preset distance is set as shown in diagram 703, it is set along the outermost character areas from the character areas in a touch keypad.

Figure 8:
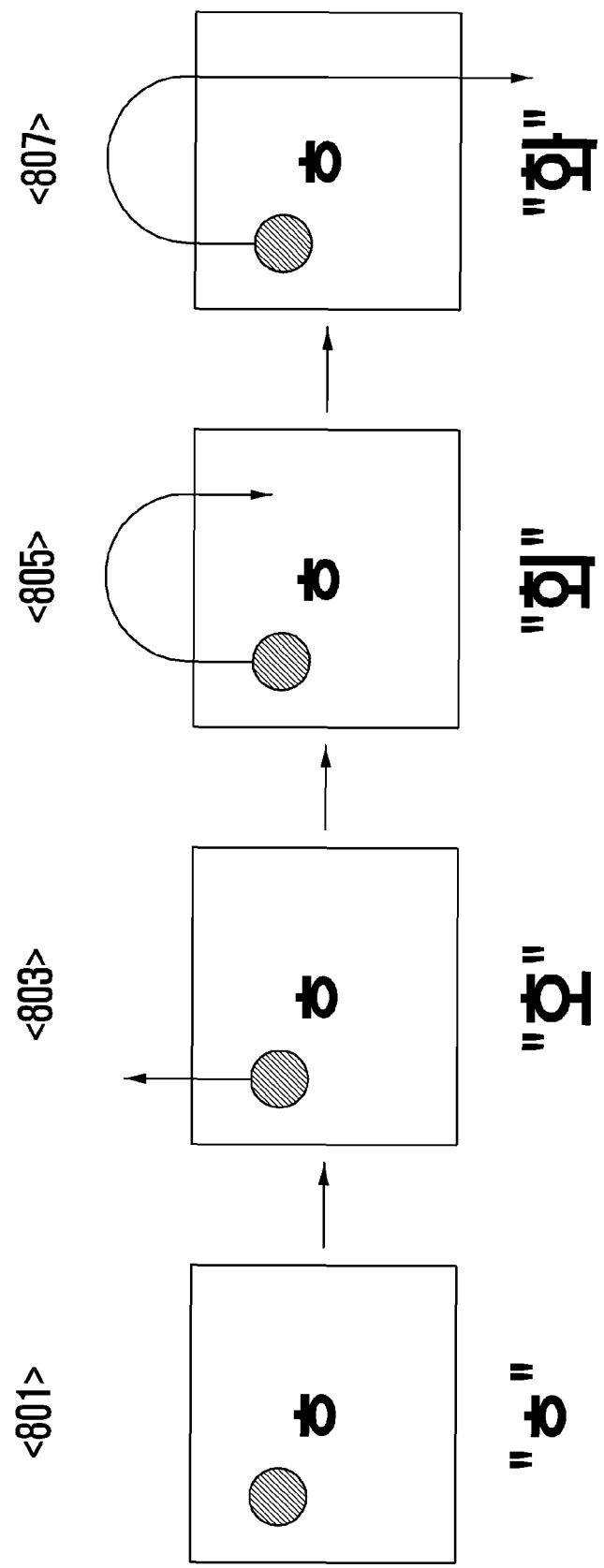
FIGS. 8 to 11 illustrate interactions for inputting characters to a touch-based electronic device, according to an embodiment of the present invention.

FIG. 8 illustrates a first embodiment of a method for inputting characters via a touch-based electronic device, according to the present invention.

Referring to FIG. 8, the Korean character '호' and part of the block Korean characters '호, 회, 화' are input to a touch-based electronic device when a touch interaction, a draw interaction, a draw-and-backtrack-flick interaction and a draw-and-backtrack-drag interaction are performed on the character area allocated to a particular character (e.g., the Korean consonant 'ㅎ').

As shown in diagram 801, the user creates a touch interaction on the character area in the touch keypad of a touch input area, to which the character 'ㅎ' is allocated. In that case, the character 'ㅎ' appears on the display area. If the user releases the touch interaction, the character 'ㅎ' is processed as a final input character and determined as a block character.

The user holds the touch on the character area as shown in diagram 801 and then drags the touch upward without losing touch as shown in diagram 803 (i.e., the user creates a draw interaction). In that case, the character 'ㅎ' is combined with the vowel 'ㅗ' of the top direction group of vowels, corresponding to the draw interaction in the top direction, thereby displaying the combined character '호' on the display area. If the user releases the draw interaction, the combined character '호' is processed as a final input character and determined as a block character.

The user retains the draw interaction on the character area as shown in diagram 803 and then flicks the draw interaction in the opposite direction in a curved manner as shown in diagram 805 (i.e., the user creates a draw-and-backtrack-flick interaction). In that case, the character '호' is combined with the vowel 'ㅣ' of the top diagonal direction group of vowels, corresponding to the draw-and-backtrack-flick interaction, thereby displaying the combined character '회' on the display area. If the user releases the draw-and-backtrack-flick interaction, the combined character is processed as a final input character and determined as a block character.

The user creates an interaction such as the draw-and-backtrack-flick interaction on the character area as shown in diagram 805 and then drags the touch it greater than a preset distance in the opposite direction as shown in diagram 807 (i.e., the user creates a draw-and-backtrack-drag interaction). In that case, the character '회' is combined with the point '●' corresponding to the draw-and-backtrack-drag interaction, thereby displaying the combined character ' 화 ' on the display area. If the user releases the draw-and-backtrack-drag interaction, the combined character ' 화 ' is processed as a final input character and determined as a block character.

Figure 9:
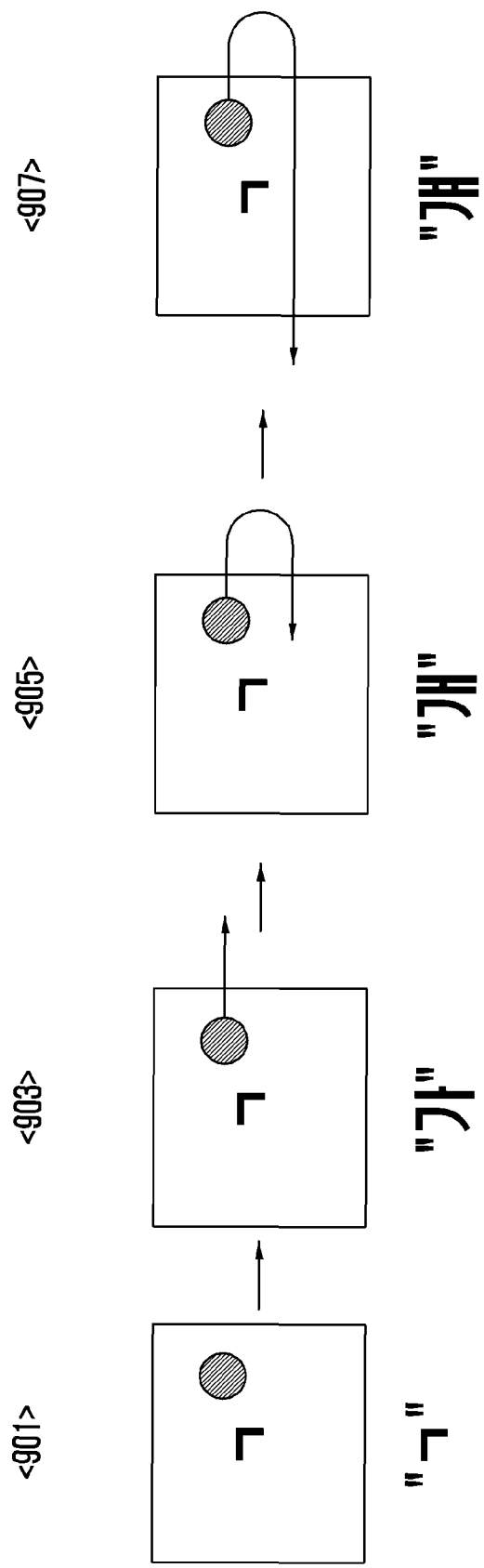

FIG. 9 illustrates a second embodiment of a method for inputting characters via a touch-based electronic device, according to the present invention.

Referring to FIG. 9, the Korean character 'ㄱ' and part of the block Korean characters '가, 개, 걔' are input to a touch-based electronic device when a touch interaction, a draw interaction, a draw-and-backtrack-flick interaction and a draw-and-backtrack-drag interaction are performed on the character area allocated to a particular character (e.g., the Korean consonant 'ㄱ').

As shown in diagram 901, the user creates a touch interaction on the character area in the touch keypad of a touch input area, to which the character 'ㄱ' is allocated. In that case, the character 'ㄱ' appears on the display area. If the user releases the touch interaction, the character 'ㄱ' is processed as a final input character and determined as a block character.

The user holds the touch on the character area as shown in diagram 901 and then drags the touch to the right, as indicated by the arrow, without losing touch as shown in diagram 903 (i.e., the user creates a draw interaction). In that case, the character 'ㄱ' is combined with the vowel 'ㅏ' of the right direction group of vowels, corresponding to the draw interaction in the right direction, thereby displaying the combined character '가' on the display area. If the user releases the draw interaction, the combined character '가' is processed as a final input character and determined as a block character.

The user retains the draw interaction on the character area as shown in diagram 903 and then flicks the draw interaction in the opposite direction in a curved manner as shown in diagram 905 (i.e., the user creates a draw-and-backtrack-flick interaction). In that case, the character '가' is combined with the vowel 'ㅣ' corresponding to the draw-and-backtrack-flick interaction, and the combined character ' 개 ' is displayed on the display area. If the user releases the draw-and-backtrack-flick interaction, the combined character ' 개 ' is processed as a final input character and determined as a block character.

The user creates an interaction such as the draw-and-backtrack-flick interaction on the character area as shown in diagram 905 and then drags the touch greater than a preset distance in the opposite direction as shown in diagram 907 (i.e., the user creates a draw-and-backtrack-drag interaction). In that case, the character ' 개 ' is combined with the point '●' corresponding to the draw-and-backtrack-drag interaction, thereby displaying the combined character '걔' on the display area. If the user releases the draw-and-backtrack-drag interaction, the combined character '걔' is processed as a final input character and determined as a block character.

Figure 10:
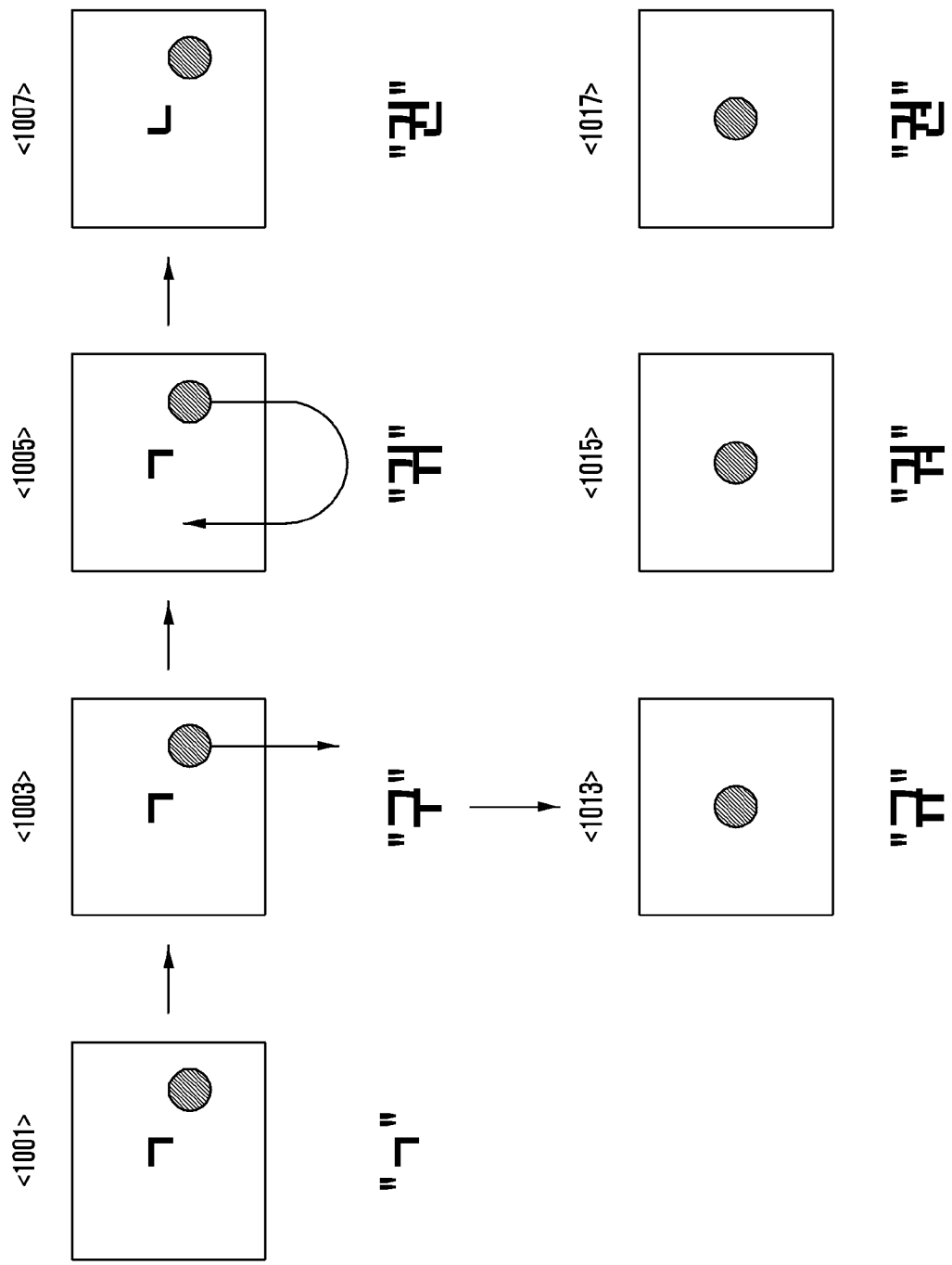

FIG. 10 illustrates a third embodiment of a method for inputting characters to a touch-based electronic device, with the correction via a correction key, according to the present invention.

Referring to FIG. 10, the block Korean characters formed by 'consonant+vowel' or 'consonant+vowel+consonant,' e.g., '구, 규, 귀, 긔, 권 and 궨', are input to a touch-based electronic device when a touch interaction, a draw interaction, a draw-and-backtrack-flick interaction and a correction interaction are performed on the character area allocated to a particular character (e.g., the Korean consonant 'ㄱ').

As shown in diagram 1001, the user creates a touch interaction on the character area in the touch keypad of a touch input area, to which the character 'ㄱ' is allocated. In that case, the character 'ㄱ' appears on the display area. If the user releases the touch interaction, the character 'ㄱ' is processed as a final input character and determined as a block character.

The user holds the touch on the character area as shown in diagram 1001 and then drags the touch downward, as indicated by the arrow, without losing touch as shown in diagram 1003 (i.e., the user creates a draw interaction). In that case, the character '┐' is combined with the vowel 'ㅜ' of the bottom direction group of vowels, corresponding to the draw interaction in the bottom direction, thereby displaying the combined character '구' on the display area. If the user releases the draw interaction, the combined character '구' is processed as a final input character and determined as a block character. If the user intends to input a block character '규' but instead inputs the block character '구' because he/she has released the draw-and-backtrack-flick interaction, the conventional art requires the user to delete the block character '규' and to re-input the block character '구.'

On the contrary, the character input system and method according to the present invention enables the user to directly correct the block character '규' from the block character '구' via a correction key provided on the touch input area, without deleting the block character '구'. For example, if the block character '구' has been input due to the release of the draw interaction as shown in diagram 1003, the user creates a touch interaction on the correction key provided on a touch input area (e.g., a character area to which the point '●' is allocated) as shown in diagram 1013. In that case, the character '구,' which can be formed by combining the block character '구' with the point '●' is displayed on the display area.

If the user releases the touch interaction, the combined character '규' is processed as a final input character and determined as a block character. Alternatively, if the user re-inputs a touch interaction on the correction key within a preset time when the block character '규' has been input to the touch-based electronic device, the block character '구' is displayed on the display area immediately before the block character '규' is corrected.

The user retains the draw interaction on the character area as shown in diagram 1003 and then flicks the draw interaction in the opposite direction in a curved manner as shown in diagram 1005 (i.e., the user creates a draw-and-backtrack-flick interaction). In that case, the character '구' is combined with the vowel 'ㅓ' corresponding to the draw-and-backtrack-flick interaction, and the combined character '궈' is displayed on the display area. If the user releases the draw-and-backtrack-flick interaction, the combined character '궈' is processed as a final input character and determined as a block character.

If the user intends to input a block character '궤' but instead inputs the block character '궈' because he/she has released the draw-and-backtrack-flick interaction, the conventional art requires the user to delete the block character '궈' and to re-input the block character '궤.' On the contrary, the character input system and method according to the present invention enables the user to directly correct the block character '궤' from the block character '궈,' via a correction key provided on the touch input area, without deleting the block character '궈'.

For example, if the block character '궈' has been input due to the release of the draw-and-backtrack-flick interaction as shown in diagram 1005, the user creates a touch interaction on the correction key provided on a touch input area (e.g., a character area to which the point '●' is allocated) as shown in diagram 1015. In that case, the character '궤,' which can be formed by combining the block character '궈' with the point '●' is displayed on the display area. If the user releases the touch interaction, the combined character '궤' is processed as a final input character and determined as a block character. Alternatively, if the user re-inputs a touch interaction on the correction key within a preset time when the block character '궤' has been input to the touch-based electronic device, the block character '궈' is displayed on the display area immediately before the block character '궤' is corrected.

After inputting the character '궈' as shown in diagram 1005, the user creates a touch interaction on another character area to which the consonant character 'ㄴ' is allocated as shown in diagram 1007. In that case, the character '권,' which can be formed by combining the block character '궈' with the character 'ㄴ' is displayed on the display area. If the user releases the touch interaction, the character '권' is processed as a final input character and determined as a block character. If the user intends to input a block character '궤' but instead inputs the block character '권' because he/she has released the touch interaction, the conventional art requires the user to delete the block character '권' and to re-input the block character '궤'. On the contrary, the character input system and method according to the present invention enables the user to directly correct the block character '궤' from the block character '권' via a correction key provided on the touch input area, without deleting the block character '권'

For example, if the block character '권' has been input as shown in diagram 1007 because the user released the touch interaction on another character area, the user creates a touch interaction on the correction key provided on a touch input area (e.g., a character area to which the point '●' is allocated) as shown in diagram 1017. In that case, the character '궫', which can be formed by combining the block character '권' with the point '●' is displayed on the display area. If the user releases the touch interaction, the combined character '궫' is processed as a final input character and determined as a block character. Alternatively, if the user re-inputs a touch interaction on the correction key within a preset time when the block character '궫' has been input to the touch-based electronic device, the block character '권' is displayed on the display area immediately before the block character '궫' is corrected.

Figure 11:
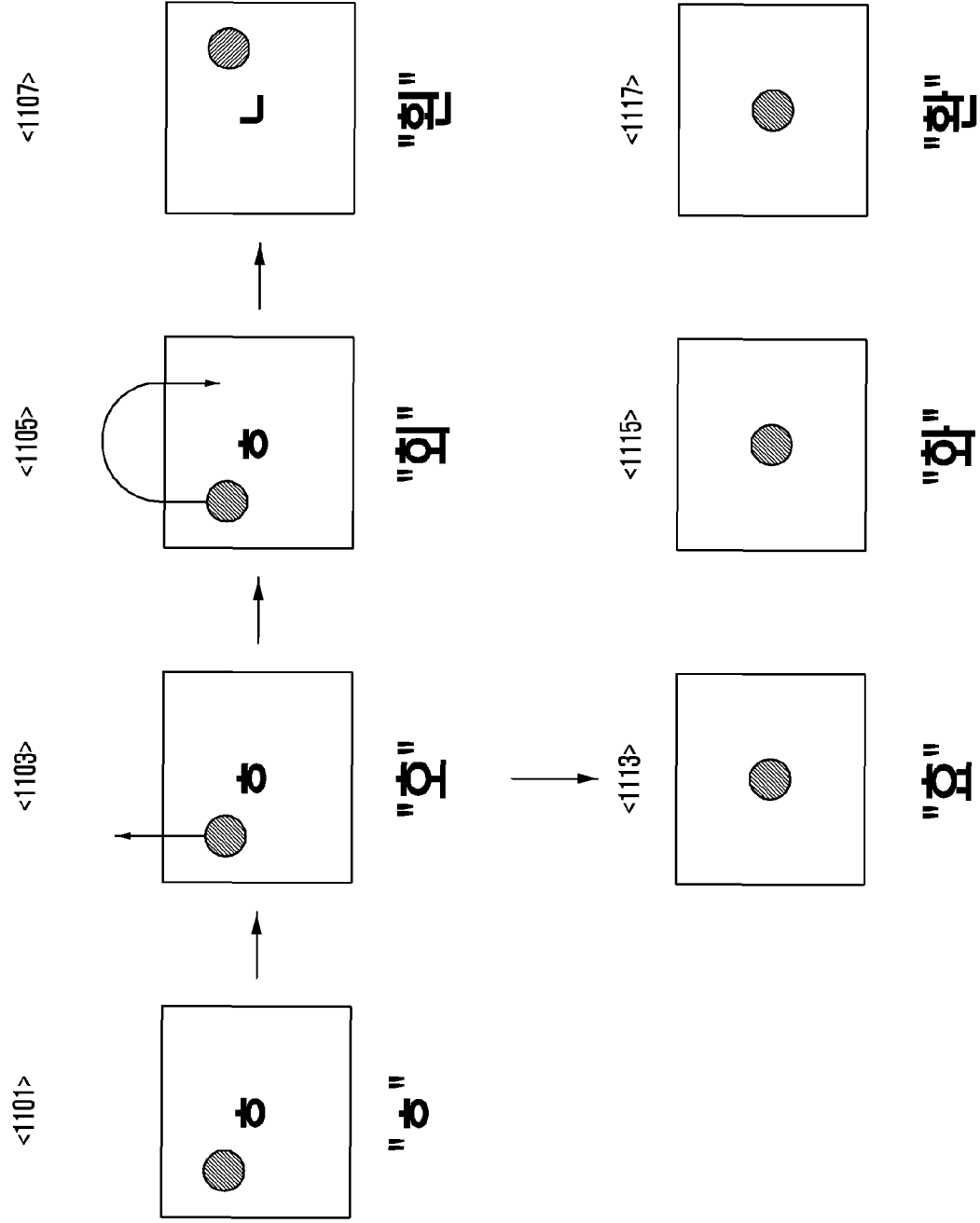

FIG. 11 illustrates a fourth embodiment of a method for inputting characters to a touch-based electronic device, with the correction via a correction key, according to the present invention.

Referring to FIG. 11, the block Korean characters formed by 'consonant+vowel' or 'consonant+vowel+consonant,' e.g., '호, 효, 회, 화, 훠 and 환' are input to a touch-based electronic device when a touch interaction, a draw interaction, a draw-and-backtrack-flick interaction and a correction interaction are performed on the character area allocated to a particular character (e.g., the Korean consonant 'ㅎ').

As shown in diagram 1101, the user creates a touch interaction on the character area in the touch keypad of a touch input area, to which the character 'ㅎ' is allocated. In that case, the character 'ㅎ' appears on the display area. If the user releases the touch interaction, the character 'ㅎ' is processed as a final input character and determined as a block character.

The user holds the touch on the character area as shown in diagram 1101 and then drags the touch upward, as indicated by the arrow, without losing touch as shown in diagram 1103 (i.e., the user creates a draw interaction). In that case, the character 'ㅎ' is combined with the vowel 'ㅗ' of the top direction group of vowels, corresponding to the draw interaction in the top direction, thereby displaying the combined character '호' on the display area. If the user releases the draw interaction, the combined character '호' is processed as a final input character and determined as a block character. If the user intends to input a block character '호' but instead inputs the block character '호' because he/she has released the draw interaction, he/she can directly correct the block character '호' from the block character '호' via a correction key provided on the touch input area, without deleting the block character '호'.

For example, if the block character '호' has been input due to the release of the draw interaction as shown in diagram 1103, the user creates a touch interaction on the correction key provided on a touch input area (e.g., a character area to which the point '●' is allocated) as shown in diagram 1113. In that case, the character '호' which can be formed by combining the block character '호' with the point '●' is displayed on the display area. If the user releases the touch interaction, the combined character '호' is processed as a final input character and determined as a block character. Alternatively, if the user re-inputs a touch interaction on the correction key within a preset time when the block character '호' has been input to the touch-based electronic device, the block character '호' is displayed on the display area immediately before the block character '호' is corrected.

The user retains the draw interaction on the character area as shown in diagram 1103 and then flicks the draw interaction in the opposite direction in a curved manner as shown in diagram 1105 (i.e., the user creates a draw-and-backtrack-flick interaction). In that case, the character '호' is combined with the vowel 'ㅣ' corresponding to the draw-and-backtrack-flick interaction, and the combined character '회' is displayed on the display area. If the user releases the draw-and-backtrack-flick interaction, the combined character '회' is processed as a final input character and determined as a block character.

If the user intends to input a block character '회' but instead inputs the block character '회' because he/she has released the draw-and-backtrack-flick interaction, he/she can directly correct the block character '회' from the block character '회' via a correction key provided on the touch input area, without deleting the block character '회'. For example, if the block character '회' has been input due to the release of the draw-and-backtrack-flick interaction as shown in diagram 1105, the user creates a touch interaction on the correction key provided on a touch input area (e.g., a character area to which the point '●' is allocated) as shown in diagram 1115. In that case, the character '회', which can be formed by combining the block character '회' with the point '●' is displayed on the display area.

If the user releases the touch interaction, the combined character '회' is processed as a final input character and determined as a block character. Alternatively, if the user re-inputs a touch interaction on the correction key within a preset time when the block character '회' has been input to the touch-based electronic device, the block character '회' is displayed on the display area immediately before the block character '회' is corrected.

After inputting the character '회' as shown in diagram 1105, the user creates a touch interaction on another character area to which the consonant character 'ㄴ' is allocated as shown in diagram 1107. In that case, the character '횐', which can be formed by combining the block character '회' with the character 'ㄴ', is displayed on the display area. If the user releases the touch interaction, the character '횐' is processed as a final input character and determined as a block character. If the user intends to input a block character '횐' but instead inputs the block character '횐' because he/she has released the touch interaction, he/she directly corrects the block character '횐' from the block character '횐' via a correction key provided on the touch input area, without deleting the block character '횐'.

For example, if the block character '횐' has been input as shown in diagram 1107 because the user released the touch interaction on another character area, the user creates a touch interaction on the correction key provided on a touch input area (e.g., a character area to which the point '●' is allocated) as shown in diagram 1117. In that case, the character '횐', which can be formed by combining the block character '횐' with the point '●' is displayed on the display area. If the user releases the touch interaction, the combined character '횐' is processed as a final input character and determined as a block character. Alternatively, if the user re-inputs a touch interaction on the correction key within a preset time when the block character '횐' has been input to the touch-based electronic device, the block character '횐' is displayed on the display area immediately before the block character '횐' is corrected.

As described above, the embodiments shown in FIGS. 10 and 11 allow the users to easily input characters to the touch-based electronic devices, without the application of automata for input characters. For example, during the input of Korean characters to touch-based electronic devices, the input Korean characters are combined by detection of whether the input Korean characters can be formed as a block character via Hangeul (Korean language) automata.

Conventional character input systems cannot correct Korean block characters until they delete them. However, the character input system according to the present invention enables the users to easily correct input Korean characters, without the application of automata for input characters. For example, since the Korean block character '구' is formed by combining the 'initial position' character with the 'medial position' character, it can be combined with only a 'final position' character as the next character. Therefore, if the character '구' is followed by a vowel, it cannot be combined with the vowel and can be a block character. However, if the user intends to input the character '구' but instead inputs the character '궈', he/she can correct the character '궈' to '궈' in such a manner that he/she inputs the point '●' on the display area while the character '궈' is being displayed. As described above, the user creates a draw-and-backtrack-flick interaction to input the character '궈' and then a touch interaction to combine the point '●' therewith, thereby inputting the character '궈.' That is, the character input system according to the present invention enables the user to easily and rapidly input or correct characters without the application of automata for input characters.

Figure 12:
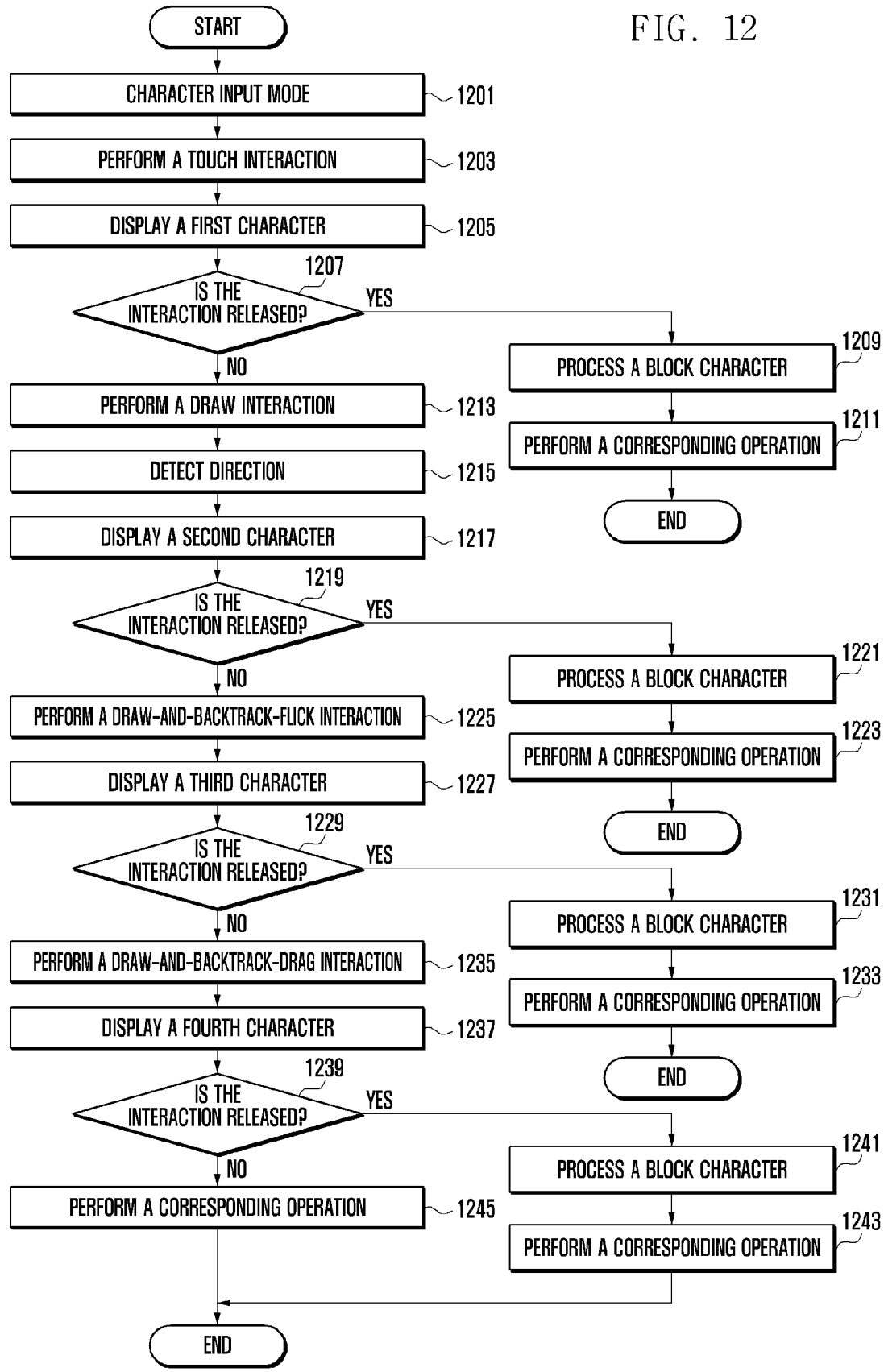
FIGS. 12 and 13 illustrate embodiments of a character input method via a touch-based electronic device, according to the present invention.

FIG. 12 illustrates a first embodiment of a character input method via a touch-based electronic device, according to the present invention.

Referring to FIG. 12, the controller 150 executes a character input mode and displays the screen on the display unit, according to the user's request in step 1201. The screen shows a display area for displaying characters according to the user's input and a touch input area for receiving the user's input touches. The touch input area includes a correction key for correcting block characters.

When a touch interaction is input to a character area in the character input mode in step 1203, the controller 150 displays a first character, allocated to the character area, on the display area in step 1205. For example, if the controller 150 senses a touch interaction on the character area to which the character 'ㄱ' is allocated, it displays the character 'ㄱ' on the display area. After that, the controller 150 determines whether the touch is released from the character area in step 1207.

When the controller 150 ascertains that the touch is released from the character area in step 1207, it processes the first character (e.g., 'ㄱ') as a final input character or a block character in step 1209. After that, the controller 150 performs a corresponding operation in step 1211, such as inputting new characters according to a user's request.

On the contrary, when the controller 150 ascertains that the touch is retained on the character area at step 1207, it detects that the touch is dragged a certain distance in a direction (which is a draw interaction) in step 1213. The controller 150 detects the movement direction of the draw interaction in step 1215, and then combines the first character with a character mapped to the draw interaction in the movement direction, and displays the combined character (second character) on the display area in step 1217.

For example, when the controller 150 detects the draw interaction moving in the right direction, it displays the combined character '가' on the display area, which can be formed by combining the character 'ㄱ' with the vowel 'ㅏ' mapped to the right direction of the draw interaction. The controller 150 then determines whether the draw interaction is released in step 1219.

When the controller 150 ascertains that the draw interaction is released from the display area in step 1219, it processes the second character (e.g., '가') as a final input character or a block character in step 1221, and then performs a corresponding operation in step 1223, such as inputting new characters according to a user's request. Alternatively, the controller 150 may correct the second character according to a user's created correction interaction. For example, when the controller 150 detects a user's created interaction for correcting the second character (e.g., '가'), it identifies a character (e.g., '구') that can be formed by combining the second character (e.g., '가') with the point '●' and displays the identified character on the display area.

On the contrary, when the controller 150 ascertains that the draw interaction is retained on the display area in step 1219, it detects that the draw interaction backtracks a relatively short distance in the opposite direction (which is a draw-and-backtrack-flick interaction) in step 1225. The controller 150 combines the second character (e.g., '가') with a character corresponding to the backtrack-flick interaction, and display the combined character or third character (e.g., '개') on the display area in step 1227. For example, when the controller 150 detects the draw-and-backtrack-flick interaction, it displays the combined character '개' on the display area, which can be formed by combining the character '가' with the vowel 'ㅣ' mapped to the backtrack-flick interaction. The controller 150 then determines whether the draw-and-backtrack-flick interaction is released in step 1229.

When the controller 150 ascertains that the draw-and-backtrack-flick interaction is released from the display area in step 1229, it processes the third character (e.g., '개') as a final input character or a block character in step 1231, and then performs a corresponding operation in step 1233, such as inputting new characters according to a user's request. Alternatively, the controller 150 may correct the third character according to a user's created correction interaction. For example, when the controller 150 detects a user's created interaction for correcting the third character (e.g., '개'), it identifies a character (e.g., '걔') that can be formed by combining the third character (e.g., '개') with the point '●' and displays the identified character on the display area.

On the contrary, when the controller 150 ascertains that the draw-and-backtrack-flick interaction is retained from the display area in step 1229, it detects that the backtrack interaction is dragged greater than a preset distance in the opposite direction (which is a draw-and-backtrack-drag interaction) in step 1235. The controller 150 combines the third character (e.g., '개') with a character corresponding to the backtrack-drag interaction, and displays the combined character or fourth character (e.g., '걔') on the display area in step 1237. For example, when the controller 150 detects the draw-and-backtrack-drag interaction, it displays the combined character '걔' on the display area, which can be formed by combining the character '개' with the point '●' mapped to the backtrack-drag interaction in the opposite direction. The controller 150 then determines whether the draw-and-backtrack-drag interaction is released in step 1239.

When the controller 150 ascertains that the draw-and-backtrack-drag interaction is released from the display area in step 1239, it processes the fourth character (e.g., '걔') as a final input character or a block character in step 1241, and then performs a corresponding operation in step 1243, such as inputting new characters according to a user's request. Alternatively, the controller 150 may correct the fourth character according to a user's created correction interaction. For example, when the controller 150 detects a user's created interaction for correcting the fourth character (e.g., '걔'), it identifies a character that can be formed by combining the third character (e.g., '개') with the point '●' and displays the character '걔' on the display area.

On the contrary, when the controller 150 ascertains that the draw-and-backtrack-drag interaction is retained from the display area in step 1239, it performs a corresponding operation according to a user's request in step 1245. For example, when the controller 150 senses that the backtrack interaction of the draw-and-backtrack-drag interaction moves back in the opposite direction along the same backtrack of the draw-and-backtrack-flick interaction, it replaces the character '개' created according to the draw-and-backtrack-drag interaction with the character '개' created according to the draw-and-backtrack-flick interaction and displays it on the display area.

Likewise, when the backtrack interaction of the draw-and-backtrack-flick interaction continues to move to the previous turning point of the draw-and-backtrack-flick interaction (i.e., the position where the draw interaction of the draw-and-backtrack-flick interaction is stopped to move back in the opposite direction), the controller 150 replaces the character '개', corresponding to the draw-and-backtrack-flick interaction, with the character '개' corresponding to the draw interaction, and displays the character '개' on the display area. As such, the character input system and method according to the present invention enables users to input from the first to fourth characters, in order, via a touch interaction, a draw interaction, a draw-and-backtrack-flick interaction, and a draw-and-backtrack-drag interaction, or to display the characters from the last input character to the first in the reverse.

Figure 13:
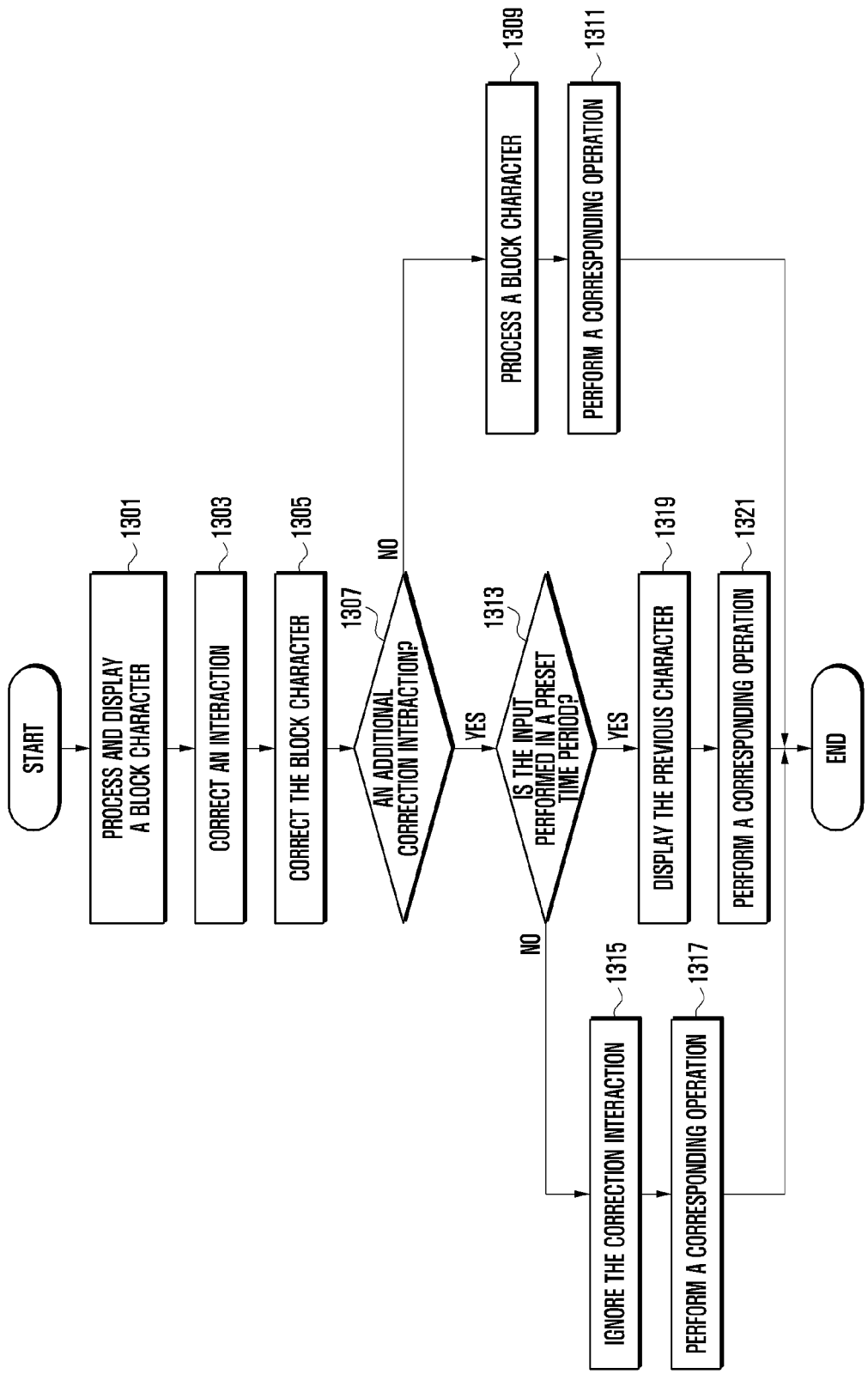

FIG. 13 illustrates a second embodiment of a character input method via a touch-based electronic device, according to the present invention.

Referring to FIG. 13, the controller 150 processes the characters, input via the interactions described in the embodiment shown in FIG. 12, as a final character or a block character, which it displays on the display area in step 1301. When the controller 150 detects a correction interaction via a correction key on the touch input area in step 1303, it corrects and displays the corrected interaction on the display area in step 1305. For example, if the block character on the display area is '가', the controller 150 displays the character '가' on the display area, instead of the character '가' that can be formed by combining the character '가' with the point '●'.

As another example, if the block character on the display area is '위', the controller 150 displays the character '위' on the display area, instead of the character '위', that can be formed by combining the character '위' with the point '●'. In addition, if the block character on the display area is '위', the controller 150 displays the character '위' on the display area, instead of the character '위', where the character '위' is formed by combining the character '위' with the point '●'.

After correcting the block character in step 1305, the controller 150 determines whether an additional correction interaction is input in step 1307. When the controller 150 ascertains that an additional correction interaction is not input in step 1307, it processes the corrected character as a final character or a block character in step 1309, and then performs a corresponding operation in step 1311, such as inputting new characters according to a user's request.

On the contrary, when the controller 150 ascertains that an additional correction interaction is input in step 1307, it further determines whether the correction interaction is input within a preset time period in step 1313.

When the controller ascertains that the additional correction interaction is not input within a preset time period in step 1313, it ignores the correction interaction in step 1315 and performs a corresponding operation in step 1317, such as controlling the display unit to display error information in response to no-input of an additional correction interaction, deleting the previous character according to a users' request, or inputting new characters according to a user's request.

On the contrary, when the controller ascertains that the additional correction interaction is input within a preset time period in step 1313, it replaces or alters the character corrected via the correction interaction to the previous character, in response to the additional correction interaction, and displays the replaced or altered character on the display area in step 1319.

For example, if the block character on the display area is '가', the controller 150 displays the previous character '가' on the display area, instead of the character '가', where the character '가' is formed by combining the character '가' with the point '●'. As another example, if the block character on the display area is '위', the controller 150 displays the previous character '위' on the display area, where the character '위' is formed by combining the character '위' with the point '●'. In addition, if the block character on the display area is '위', the controller 150 displays the character '위' on the display area that can be formed by combining the character '위' with the point '●', and then performs a corresponding operation in step 1321.

As described above, the character input system and method, according to the present invention, resolves a limitation according to the narrow character input space and errors according to user's character input motions, and supports a user's rapid character input in the touch-based electronic device. That is, the character input system and method herein enables users to easily and rapidly input a corresponding block character in the touch-based electronic device, with a limited number of input motions. The character input system and method enables users to easily input each block character in the touch-based electronic device, by performing one input motion in one character area, and too easily and rapidly edit each block character in the touch-based electronic device, by performing one input interaction, without deleting the block character.

The character input function according to the present invention is applicable to all types of touch-based electronic devices and the applications. The character input system and method provides an optimal environment in a touch-based electronic device. Therefore, users can conveniently input characters in the touch-based electronic device via the character input system and method. This enhances the ease of use of the touch-based electronic devices.

As described above, the system and method for inputting characters in a touch-based electronic device according to the present invention can be implemented with program commands that can be conducted via various types of computers and recorded in computer-readable recording media. The computer-readable recording media contain program commands, data files, data structures, or a combination thereof. The program commands recorded in the recording media may be designed or configured to comply with the present invention or may be software well-known to the ordinary person skilled in the art.

The computer-readable recoding media includes hardware systems for storing and conducting program commands. Examples of the hardware systems are magnetic media such as a hard disk, floppy disk, a magnetic tape, optical media such as CD-ROM and DVD, Magneto-Optical Media, such as floptical disk, ROM, RAM, and flash memory. The program commands include assembly language or machine code complied by a complier and a higher level language interpreted by an interpreter. The hardware systems may be implemented with at least one software module to comply with the present invention.

Although embodiments of the present invention have been described in detail hereinabove, it should be understood that many variations and modifications of the basic inventive concept herein described, which may be apparent to those skilled in the art, will still fall within the spirit and scope of the embodiments of the present invention as defined in the appended claims.

What is claimed is:

1. A character input method comprising:
   receiving a first interaction;
   displaying a first character in response to the first interaction, the first character being at least one of Korean consonants;
   receiving a second interaction successively after the first interaction;
   identifying a second character that can be formed by combining the first character with a character according to the second interaction, the character being at least one of Korean vowels; and
   displaying the second character by replacing the first character with the second character,
   wherein the first interaction comprises:
      a touch interaction input to a particular character area on a touch keypad; and
   the second interaction comprises at least one of:
      a draw interaction created when the first interaction occurs and then dragged in a first direction without releasing a touch and configured to input a preset group of vowels 'ㅗ, ㅜ, ㅓ, ㅏ, ㅡ, and ㅣ',
      a draw-and-backtrack-flick interaction created when the draw interaction is dragged a distance in a second direction, and is moved in a direction opposite to the second direction and then is moved back a shorter distance in the opposite direction and configured to input a preset group of vowels ''ㅛ, ㅠ, ㅔ, ㅐ, and ㅢ'', and
      a draw-and-backtrack-drag interaction created when the draw interaction is moved a distance in a third direction, and then is dragged back greater than a preset distance in a direction opposite to the third direction and configured to input a preset group of vowels ''ㅐ, ㅔ, ㅗ, and ㅟ'' or ''ㅓ, ㅏ, ㅛ, and ㅠ'',
   wherein the first direction of the draw interaction moves starting from a point in the particular character area to up, down, left, right and diagonal directions,
   wherein the second direction of the thaw-and-backtrack-flick interaction moves starting from the point in the particular character area to the up, down, left, right, and diagonal directions, and
   wherein the third direction of the draw-and-backtrack-drag interaction moves starting from the point in the particular character area to the up, down, left, and right directions.

2. The method of claim 1, further comprising:
   creating, when the draw interaction is input, the second character by combining the first character with a character mapped to the draw interaction; and
   replacing the first character with the second character on the display area.

3. The method of claim 1, further comprising:
   creating, when the draw-and-backtrack-flick interaction is input, a first combined character by combining the first character with a character mapped to the draw interaction of the draw-and-backtrack-flick interaction, and creating the second character by combining the first combined character with a character mapped to the backtrack-flick interaction of the draw-and-backtrack-flick interaction; and
   replacing the first character with the second character on the display area.

4. The method of claim 1, further comprising:
   creating, when the draw-and-backtrack-drag interaction is input, a first combined character by combining the first character with a character mapped to the draw interaction of the draw-and-backtrack-drag interaction,
   creating a second combined character by combining the first character with a character mapped to the backtrack interaction of the draw-and-backtrack-drag interaction, and
   creating the second character by combining the second combined character with a character mapped to the backtrack-drag interaction of the draw-and-backtrack-drag interaction; and replacing the first character with the second character on the display area.

5. The method of claim 1, further comprising:
   receiving an interaction to correct the second character corresponding to the second interaction;
   identifying a third character that is formed by combining the second character with a character corresponding to the correction interaction; and
   replacing the second character with the third character on the display area.

6. The method of claim 5, further comprising:
   restoring, when an additional correction interaction is created, the third character to the second character and displaying the second character on the display area in place of the third character.

7. The method of claim 5, further comprising:
   determining, when an additional correction interaction is created, whether an input according to the additional correction interaction is performed within a preset time period.

8. A touch-based electronic device comprising:
   a touch screen for displaying a touch input area and a display area, wherein the touch input area receives touches for characters and the display area displays the input characters; and
   a controller for displaying, when a first interaction is input to a particular character area in the touch input area, a first character, allocated to the character area, on the display area, creating, when a second interaction occurs successively after the first interaction, a second character that is formed by combining the first character with a character according to the second interaction, replacing the first character with the second character, and displaying the second character on the display area, wherein the first character is at least one of Korean consonants and the character is at least one of Korean vowels, wherein the first interaction comprises:
a touch interaction input to the particular character area on a touch keypad; and
the second interaction comprises at least one of:
- a draw interaction created when the first interaction occurs and then is dragged in a first direction without releasing a touch and configured to input a preset group of vowels "ㅗ, ㅜ, ㅓ, ㅏ, , —, and ㅣ",
- a draw-and-backtrack-flick interaction created when the draw interaction is dragged a distance in a second direction, and is moved in a direction opposite to the second direction and then is moved back a shorter distance in a direction opposite to the second direction and configured to input a preset of vowels 'ㅚ, ㅟ, ㅔ, ㅐ, , and ㅢ'", and
- a draw-and-backtrack-drag interaction created when the draw interaction is moved a distance in a third direction, and then is dragged back greater than a preset distance in a direction opposite to the third direction and configured to input a preset group of vowels "ㅐ, ㅔ, ㅘ, and ㅝ' or 'ㅓ, ㅏ, ㅛ, and ㅠ', wherein the first direction of the draw interaction moves starting from a point in the particular character area to up, down, left, right and diagonal directions, wherein the second direction of the draw-and-backtrack-flick interaction moves starting from the point in the particular character area to the up, down, left, right, and diagonal directions, and wherein the third direction of the draw-and-backtrack-drag interaction moves starting from the point in the particular character area to the up, down, left, and right directions.

9. The touch device of claim 8, wherein the controller performs the following:

creating, when the draw interaction occurs successively after the touch interaction, a third character by combining the first character with a character mapped to the draw interaction, and replacing the first character with the third character on the display area;

creating, when a backtrack-flick interaction occurs successively after the draw interaction, a fourth character by combining the third character with a character mapped to the backtrack-flick interaction of the draw-and-backtrack-flick interaction, and replacing the third character with the fourth character on the display area; and creating, when a backtrack-drag interaction occurs successively after the draw interaction, a fifth character by combining the fourth character with a character mapped to the backtrack-drag interaction of the draw-and-backtrack-drag interaction, and replacing the fourth character with the fifth character on the display area.

10. The touch device of claim 8, wherein the controller receives an interaction to correct the second character corresponding to the second interaction, identifies a character that is formed by combining the second character with a character corresponding to the correction interaction, replaces the second character with the combined character, and displays the combined character on the display area.

* * * * *